June 14, 1949.  D. H. WAARA  2,473,400
MOLDING CLIP
Filed July 17, 1946

INVENTOR
DAVID H. WAARA
BY
ATTORNEY

Patented June 14, 1949

2,473,400

UNITED STATES PATENT OFFICE 2,473,400

MOLDING CLIP

David H. Waara, Detroit, Mich., assignor to
Robert L. Brown, Ferndale, Mich.

Application July 17, 1946, Serial No. 684,222

3 Claims. (Cl. 24—73)

This invention relates to moldings, trim strips and like construction and more particularly to improved means for securing finished objects to supporting surfaces, especially those readily accessible from one side only.

A primary object of the invention is to provide a spring clip fastening device which is designed to secure cooperating members in assembled relation under continuously effective spring tension.

Another object of the invention is to provide a plurality of fastening devices which are readily applied to a hollow molding having spaced inturned flanges.

A further object of the invention is to provide a fastening device which is resiliently held in the hollow molding by spring arms to accommodate variations in the molding height.

A still further object of the invention is to stamp the fastener from sheet metal, preferably spring steel, and to form spring arms struck out from the body portion of the stamping.

A further object of the invention is to form the opposite end portions of the fastener with an arc such that the fastener may be inserted between the edges of the molding flanges and twisted into holding position between the top wall of the molding and the flanges.

Other objects and advantages of the invention will more fully appear from the following description taken in connection with the accompanying drawings in which.

Figure 1:
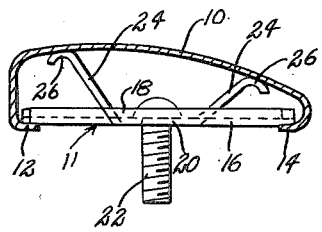
Fig. 1 illustrates one form of the improved molding construction, the attaching clip being shown in side elevation with the molding illustrated in section.

Referring to the drawings, 10 represents a hollow molding or trim strip provided with the usual inturned flanges 12 and 14 which is to be mounted on apertured support, not shown. Preparatory to assembly of the molding on the supporting surface, the formed clips 11 are inserted in the molding between the inwardly turned flanges 12 and 14. They are positioned in spaced relation and applied to the supporting surface.

The clip 11 comprises a one piece sheet metal stamping, preferably spring steel, of rectangular form. The base of the clip is channel shaped having a bottom wall 16 and side flanges 18. At the center of the bottom wall 16 is an aperture 20 for receiving a screw 22 for securing the molding to the apertured support. Struck out of the body of the bottom wall are arms 24 which are bent upwardly and diverge outwardly. The ends of the arms 24 are enlarged and are bent to form rounded surfaces 26 for engagement with the inner surface of the molding.

The opposite ends of the bottom wall 16 are straight throughout a portion of their width at opposite sides and then curved inwardly throughout the remaining width. This is to permit the clip to be diagonally inserted between the inwardly extending flanges 12 and 14 of the molding 10 and then turned into a position with its longitudinal axis at right angles to the longitudinal dimension of the molding, thereby firmly positioning the clip in a predetermined position with the resilient arms 24 tensioned between the inner wall of the molding and the flanges 12 and 14.

Figure 3:
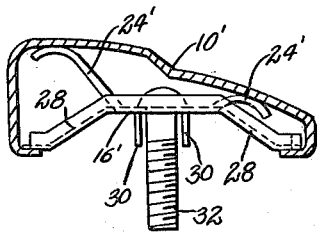
Fig. 3 is a view corresponding to Fig. 1 but showing a modified form of the invention.
Figure 2:
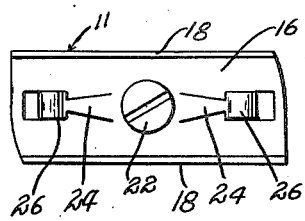
Fig. 2 is a top plan view of the clip shown in Fig. 1.

In the forms of the invention shown in Figs. 3 to 6 inclusive, the base of the clip has a central raised portion with integral downwardly sloping end portions 28. This is desirable where the molding is of greater thickness. In Fig. 3 the arms 24' are of different lengths to accommodate moldings of irregular contour. The arms 24' are sheared out of the sloping end portions 28.

Figure 4:
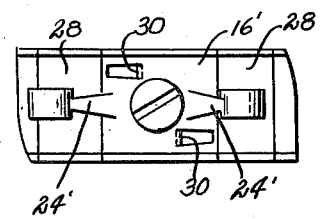
Fig. 4 is a top plan view of the clip shown in Fig. 3.

In order to form a more rigid support for the central bottom wall portion 16', there are downwardly extending arms 30 sheared from the central bottom wall portion, Figs. 3 and 4. The outer ends of the arms 30 terminate substantially in a plane with the lower free ends of the portions 28 to bear against the supporting structure when the bolt 32 is drawn to holding position.

Figure 5:
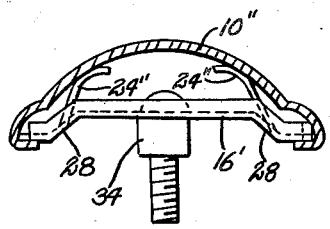
Fig. 5 is a view corresponding to Fig. 1 but showing a further modification of the invention.
Figure 6:
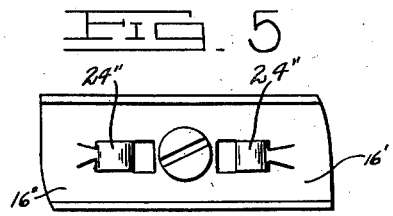
Fig. 6 is a top plan view of the clip shown in Fig. 5.

The form shown in Figs. 5 and 6 is somewhat similar to the form shown in Figs. 3 and 4 except that the arms 24" are bent from an inner point outwardly and a sleeve 34 is used in place of the arms 30 in Fig. 3.

The spring tension of the clip when assembled is such that the clips are firmly held in the molding so that the clips remain in their applied position for registry with the apertures in the supporting structure.

While the invention has been described in detail with specific examples, it will be understood that various changes including the size, shape and arrangement of parts may be made without departing from the spirit of my invention and it is not my intention to limit its scope other than by the terms of the appended claims.

I claim:

1. A clip for mounting a hollow molding having spaced inturned flanges, said clip comprising a channel shaped stamping having a central base portion and downwardly projecting end portions, upwardly and outwardly projecting arms stamped from the bottom wall of said downwardly projecting end portions, and downwardly projecting arms stamped from the central base portion.

2. A clip for mounting a hollow molding having spaced inturned flanges, said clip comprising a channel shaped stamping having a central base portion and downwardly projecting end portions, upwardly and outwardly projecting arms stamped from the bottom wall of said downwardly projecting end portions, and downwardly projecting arms stamped from the central base portion, the lower ends of said downwardly projecting arms being in a plane with the ends of said downwardly projecting end portions of said base.

3. A clip for mounting a hollow molding having spaced inturned flanges, said clip comprising a channel shaped stamping having a central base portion and downwardly projecting end portions, upwardly and outwardly projecting arms stamped from the bottom wall of said downwardly projecting end portions, and downwardly projecting arms stamped from the central base portion, the opposite ends of said clip being curved.

DAVID H. WAARA.

REFERENCES CITED

The following references are of record in the file of this patent:

UNITED STATES PATENTS

| Number | Name | Date |
| --- | --- | --- |
| 2,015,754 | Koenig et al. | Oct. 1, 1935 |
| 2,105,706 | Stamy | Jan. 18, 1938 |
| 2,148,847 | Wiley | Feb. 28, 1939 |
| 2,216,219 | Wiley | Oct. 1, 1940 |
| 2,275,119 | Wiley | Mar. 3, 1942 |
| 2,278,627 | Wernig | Apr. 7, 1942 |
| 2,330,675 | Brown | Sept. 23, 1943 |